US010818285B2

(12) United States Patent
Lee et al.

(10) Patent No.: US 10,818,285 B2
(45) Date of Patent: Oct. 27, 2020

(54) ELECTRONIC DEVICE AND SPEECH RECOGNITION METHOD THEREFOR

(71) Applicant: Samsung Electronics Co., Ltd., Suwon-si (KR)

(72) Inventors: Jungin Lee, Yongin-si (KR); Ran Han, Suwon-si (KR); Seokyeong Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 15/841,217

(22) Filed: Dec. 13, 2017

(65) Prior Publication Data

US 2018/0182386 A1 Jun. 28, 2018

(30) Foreign Application Priority Data

Dec. 23, 2016 (KR) .......................... 10-2016-0178069

(51) Int. Cl.
*G10L 15/19* (2013.01)
*G10L 15/32* (2013.01)
(Continued)

(52) U.S. Cl.
CPC .............. *G10L 15/19* (2013.01); *G10L 15/14* (2013.01); *G10L 15/183* (2013.01); *G10L 15/22* (2013.01);
(Continued)

(58) Field of Classification Search
CPC ....................................................... G10L 15/32
(Continued)

(56) References Cited

U.S. PATENT DOCUMENTS 9,047,868 B1 * 6/2015 O'Neill ................. G10L 15/197
9,324,323 B1   4/2016 Bikel et al.
(Continued)

FOREIGN PATENT DOCUMENTS

KR    1020160010961 A    1/2016
WO    2015/005679 A1    1/2015

OTHER PUBLICATIONS

European Search Report dated May 3, 2018 in connection with European Patent Application No. 17 20 7420.
(Continued)

*Primary Examiner* — Huyen X Vo
*Assistant Examiner* — Timothy Nguyen

(57) ABSTRACT

Provided are an electronic device and speech recognition method therefor. The electronic device may include a communication interface to receive speech data from an external electronic device, a memory to store a common language model used by default for speech recognition, a first language model designated for each user, a second language model associated with context information of each user, and a third language model associated with words collected by the electronic device for a preset period of time from the reception time of the speech data; and a processor to perform a procedure of combining at least one of the first language model, the second language model, and the third language model with the common language model to construct an integrated language model, performing speech recognition on the basis of the speech data and the integrated language model, and outputting a speech recognition result corresponding to the speech data.

18 Claims, 12 Drawing Sheets

(51) Int. Cl.
*G10L 15/30* (2013.01)
*G10L 15/183* (2013.01)
*G10L 15/14* (2006.01)
*G10L 15/22* (2006.01)

(52) U.S. Cl.
CPC .............. *G10L 15/32* (2013.01); *G10L 15/30* (2013.01); *G10L 2015/223* (2013.01); *G10L 2015/228* (2013.01)

(58) Field of Classification Search
USPC .......................................................... 704/257
See application file for complete search history.

(56) References Cited

U.S. PATENT DOCUMENTS

| | | | |
|---|---|---|---|
| 9,502,032 B2 | 11/2016 | Aleksic et al. | |
| 2002/0087315 A1* | 7/2002 | Lee ..................... | H04M 3/4938 704/9 |
| 2005/0125218 A1* | 6/2005 | Rajput ................... | G06F 40/44 704/8 |
| 2007/0239637 A1 | 10/2007 | Paek et al. | |
| 2009/0018833 A1 | 1/2009 | Kozat et al. | |
| 2009/0030687 A1* | 1/2009 | Cerra ..................... | G10L 15/065 704/243 |
| 2012/0059653 A1* | 3/2012 | Adams ................... | G10L 15/19 704/243 |
| 2012/0101817 A1* | 4/2012 | Mocenigo ............. | G10L 15/063 704/231 |
| 2012/0166196 A1* | 6/2012 | Ju .......................... | G10L 15/19 704/254 |
| 2016/0019887 A1 | 1/2016 | Kim et al. | |
| 2018/0182386 A1* | 6/2018 | Lee ....................... | G10L 15/19 |

OTHER PUBLICATIONS

Summons to attend oral proceedings pursuant to Rule 115(1) EPC in connection with European Application No. 17207420.5 dated Nov. 25, 2019, 9 pages.

Goldwyn, RM, "Distinction at Exit Between Text Editing and Speech Recognition Adaption," IBM Technical Disclosure Bulletin, vol. 37, No. 10, Oct. 1994, 3 pages.

* cited by examiner

ELECTRONIC DEVICE AND SPEECH RECOGNITION METHOD THEREFOR

CROSS-REFERENCE TO RELATED APPLICATION(S)

The present application is related to and claims priority to Korean patent application number 10-2016-0178069 filed on Dec. 23, 2016, the contents of which are incorporated herein by reference.

TECHNICAL FIELD

The present disclosure relates to an electronic device and a speech recognition method therefor.

BACKGROUND

Various electronic devices, such as smartphones, tablet personal computers, portable multimedia players, personal digital assistants, laptop personal computers and wearable devices have been popularized. Furthermore, such an electronic device may be equipped with a technique for controlling various functions thereof on the basis of speech sounds uttered by the user.

To control functions according to speech sounds of the user, the electronic device may have a speech recognition function for recognizing speech uttered by the user.

A speech recognition technology can use an acoustic model and a language model to recognize speech uttered by the user. The acoustic model may refer to a database in which feature vectors obtained by processing speech data and groups of phoneme candidates including phonemes corresponding to the feature vectors are mapped and stored. The language model may refer to a database that stores information used to model linguistic order relations between words or syllables on the basis of phonemes corresponding to the speech data and extracted from the acoustic model. A language model can be created by collecting commonly and frequently used words or sentence patterns.

Additional techniques may be used in the language model for speech recognition to improve the speech recognition accuracy. For example, a technique may be used that extracts information from a user's personalized device and modifies the language model according to the extracted user information. The speech recognition technique using a language model that is adjustable according to user information on the basis of a common language model can contribute to improvement of speech recognition performance for a specific user.

However, to improve the accuracy of speech recognition, it is necessary to reflect not only the characteristics of the user but also information on the time and situation of performing speech recognition.

Hence, to improve the accuracy of speech recognition, it is necessary to use various speech recognition models in combination, including a speech recognition model reflecting the characteristics of the user.

SUMMARY

To address the above-discussed deficiencies, it is a primary object of the present disclosure to address the above mentioned problems and/or disadvantages and to provide at least the advantages described below. Accordingly, an aspect of the present disclosure is to provide an apparatus and method that construct an integrated language model using various kinds of detailed language models in order to improve the accuracy of speech recognition in various situations in which speech recognition is performed.

Another aspect of the present disclosure is to provide an apparatus and method that maximize speech recognition performance in various situations where speech recognition is performed by varying detailed language models integrated with the common language model in type and combination.

Various embodiments of the present disclosure relate to performing speech recognition using an integrated language model generated by combining various language models.

In accordance with an aspect of the present disclosure, there is provided an electronic device. The electronic device may include: a communication interface to receive speech data of a user and user information from an external electronic device; a memory to store a common language model used by default for speech recognition, a first language model designated for each user, a second language model associated with context information of each user, and a third language model associated with words collected by the electronic device for a preset period of time from the reception time of the speech data; and a processor to perform a procedure of combining at least one of the first language model, the second language model, and the third language model with the common language model to construct an integrated language model, performing speech recognition on the basis of the speech data and the integrated language model, and outputting a speech recognition result corresponding to the speech data.

In accordance with another aspect of the present disclosure, there is provided an electronic device. The electronic device may include: a microphone to pick up a speech signal of a user and convert the speech signal into speech data; a communication interface to transmit the speech data to an external electronic device; a memory to store the speech data, user information, and context information; and a processor to perform a procedure of extracting words entered by the user through the keypad, controlling the communication interface to send a list of the extracted words to the external electronic device, controlling the communication interface to receive a speech recognition result from the external electronic device, and outputting the speech recognition result, wherein the speech recognition result is produced on the basis of the speech data and an integrated language model that is constructed by combining at least one of a first language model constructed based on the list of words, a second language model constructed based on the context information of the user, and a third language model constructed based on words collected by the external electronic device for a preset period of time from the transmission time of the speech data with a common language model used by default for speech recognition.

In accordance with another aspect of the present disclosure, there is provided a method of speech recognition for an electronic device. The method may include: receiving speech data of a user and user information from an external electronic device; constructing an integrated language model by combining a common language model with at least one of a first language model associated with an identifier of the external electronic device contained in the user information, a second language model associated with context information of the user, and a third language model associated with words collected by the electronic device for a preset period of time from the reception time of the speech data; and outputting a speech recognition result corresponding to the speech data on the basis of the integrated language model.

In a feature of the present disclosure, the electronic device and speech recognition method thereof can perform speech recognition using various language models including a language model related to user characteristics, a language model related to the time point at which speech recognition is performed, and a language model related to context information, thereby achieving a higher speech recognition accuracy.

In another feature of the present disclosure, it is possible to achieve a higher speech recognition accuracy by applying different weights to the language models used for speech recognition so that a relatively high weight is given to the language model suited to the user's situation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
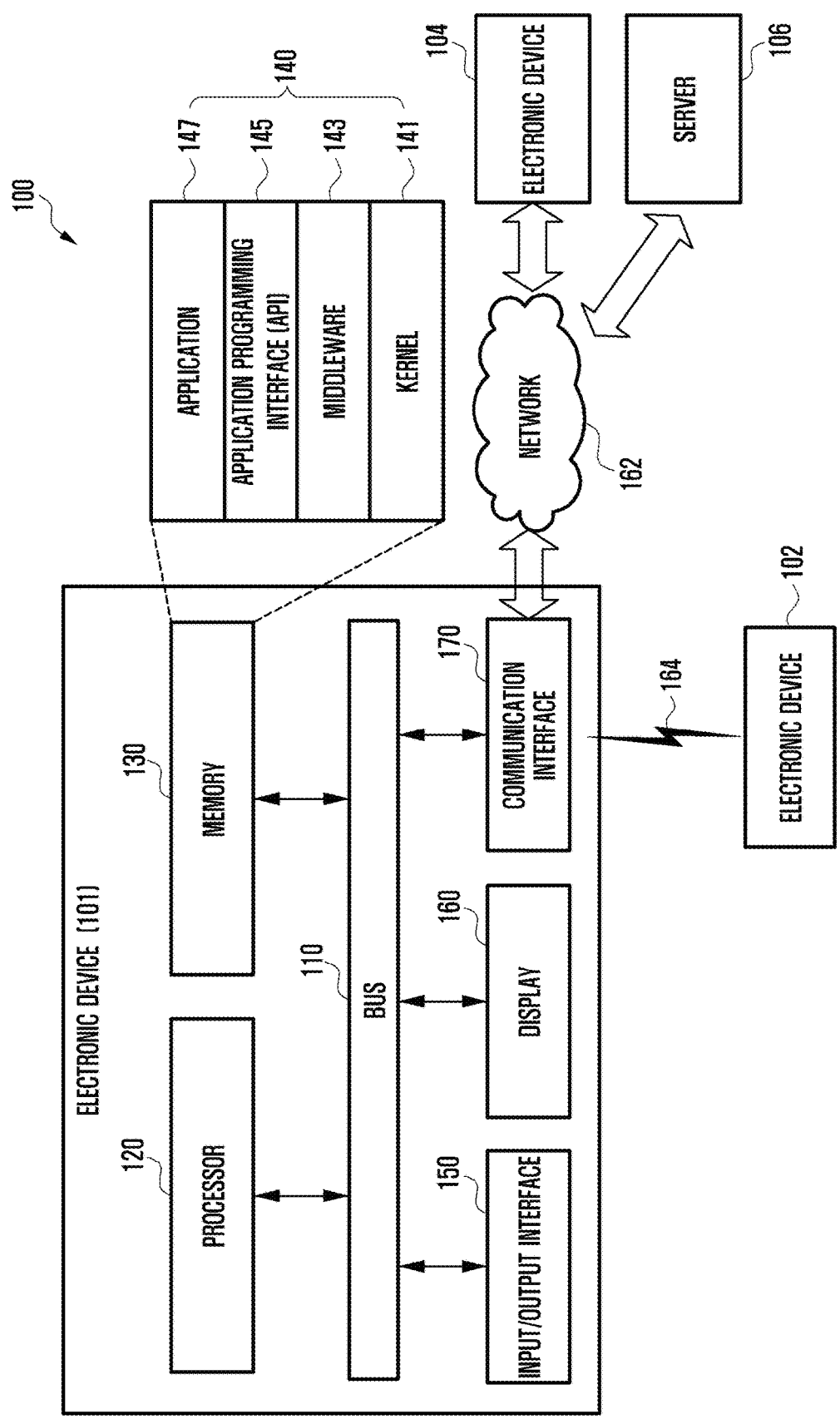
FIG. 1 illustrates electronic devices in a network environment according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description is made with reference to the accompanying drawings and is provided to assist in a comprehensive understanding of various example embodiments of the present disclosure as defined by the claims and their equivalents. It includes various specific details to assist in that understanding but these are to be regarded as merely examples. Accordingly, those of ordinary skill in the art will recognize that various changes and modifications of the various example embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, may simply be used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" may generally denote that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions, such as "include" and "may include" which may be used in the present disclosure may refer, for example, to the presence of the disclosed functions, operations, and constituent elements and do not limit one or more additional functions, operations, and elements. In an example embodiment of the present disclosure, the terms, such as "include" and/or "have" may be understood to refer, for example, to a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In an example embodiment of the present disclosure, expressions including ordinal numbers, such as "first" and "second," and the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component there between.

An electronic device according to the present disclosure may be a device including a communication function. For example, and without limitation, the device may correspond to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a television (TV), a digital versatile disc (DVD) player, an audio device, various medical devices (for example, magnetic resonance angiography (MRA), magnetic resonance imaging (MRI), computed tomography (CT), a scanning machine, a ultrasonic wave device, and the like), a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, and the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, or the like. It will be apparent to those skilled in the art that the electronic device according to the present disclosure is not limited to the aforementioned devices.

According to various example embodiments of the present disclosure, cores included in the processor of the electronic device may be in one of various states. In the method for operating the electronic device, when a core is in the online state, power is normally applied to the core and the core is able to normally execute a process.

In the method for operating the electronic device, when a core is in the idle state, power is applied to the core but the core does not execute a process.

In the method for operating the electronic device, when a core is in the power save state, power whose level is lower than that of power applied in the online state is applied to the core and the core does not execute a process.

In the method for operating the electronic device, when a core is in the offline state, power is not applied to the core and the cache associated with the core is emptied of stored data. Hence, when a core is in the offline state, the core is unable to execute a process.

In the method for operating the electronic device, when the processor includes a first core and a second core, hot-unplugging (hot-plug out) may refer to transitioning the first core from the online state to the offline state. When the processor includes a first core and a second core, hot-plugging (hot-plug in) may refer to transitioning the first core from the offline state to the online state.

In the method for operating the electronic device, a restriction signal may refer to a command signal causing a core to transition into the power save state so as to place restrictions on the usage of the processor.

In the method for operating the electronic device, a restriction lift signal may refer to a command signal for lifting restrictions on the usage of the processor. That is, the restriction lift signal may cause a core to transition into the online state.

FIG. 1 is a block diagram illustrating example electronic devices in a network environment 100 according to various example embodiments of the present disclosure.

Referring to FIG. 1, an electronic device 101 may include a bus 110, a processor 120 (e.g., including processing circuitry), a memory 130, an input/output interface 150 (e.g., including interface circuitry), a display 160, a communication interface 170 (e.g., including communication circuitry), and other similar and/or suitable components.

The bus 110 may be a circuit which interconnects the above-described elements and delivers a communication (e.g., a control message) between the above-described elements.

The processor 120 may include various processing circuitry and receive commands from the above-described other elements (e.g., the memory 130, the input/output interface 150, the display 160, the communication interface 170, and the like) through the bus 110, may interpret the received commands, and may execute calculation or data processing according to the interpreted commands. Although illustrated as one element, the processor 120 may include multiple processors without departing from the teachings herein.

The memory 130 may store commands or data received from the processor 120 or other elements (e.g., the input/output interface 150, the display 160, the communication interface 170, and the like) or generated by the processor 120 or the other elements. The memory 130 may include programming modules 140, such as a kernel 141, middleware 143, an application programming interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, and the like) used to execute operations or functions implemented by other programming modules (e.g., the middleware 143, the API 145, and the application 147). In addition, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. In addition, in relation to work requests received from one or more applications 147 and/or the middleware 143, for example, may perform load balancing of the work requests by using a method of assigning a priority, in which system resources (e.g., the bus 110, the processor 120, the memory 130, and the like) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may include various interface circuitry and, for example, may receive a command or data as input from a user, and may deliver the received command or data to the processor 120 or the memory 130 through the bus 110. The display 160 may display a video, an image, data, and the like, to the user.

The communication interface 170 may include various communication circuitry and connect communication between electronic devices 102 and 104 and the electronic device 101. The communication interface 170 may support a short-range communication protocol 164 (e.g., Wi-Fi, Bluetooth (BT), and near field communication (NFC)), or a network 162 communication (e.g., the internet, a local area network (LAN), a wide area network (WAN), a telecommunication network, a cellular network, a satellite network, a plain old telephone service (POTS), and the like). Each of the electronic devices 102 and 104 may be a device which is identical (e.g., of an identical type) to or different (e.g., of a different type) from the electronic device 101. Further, the communication interface 170 may connect communication between a server 106 and the electronic device 101 via the network 162.

Figure 2:
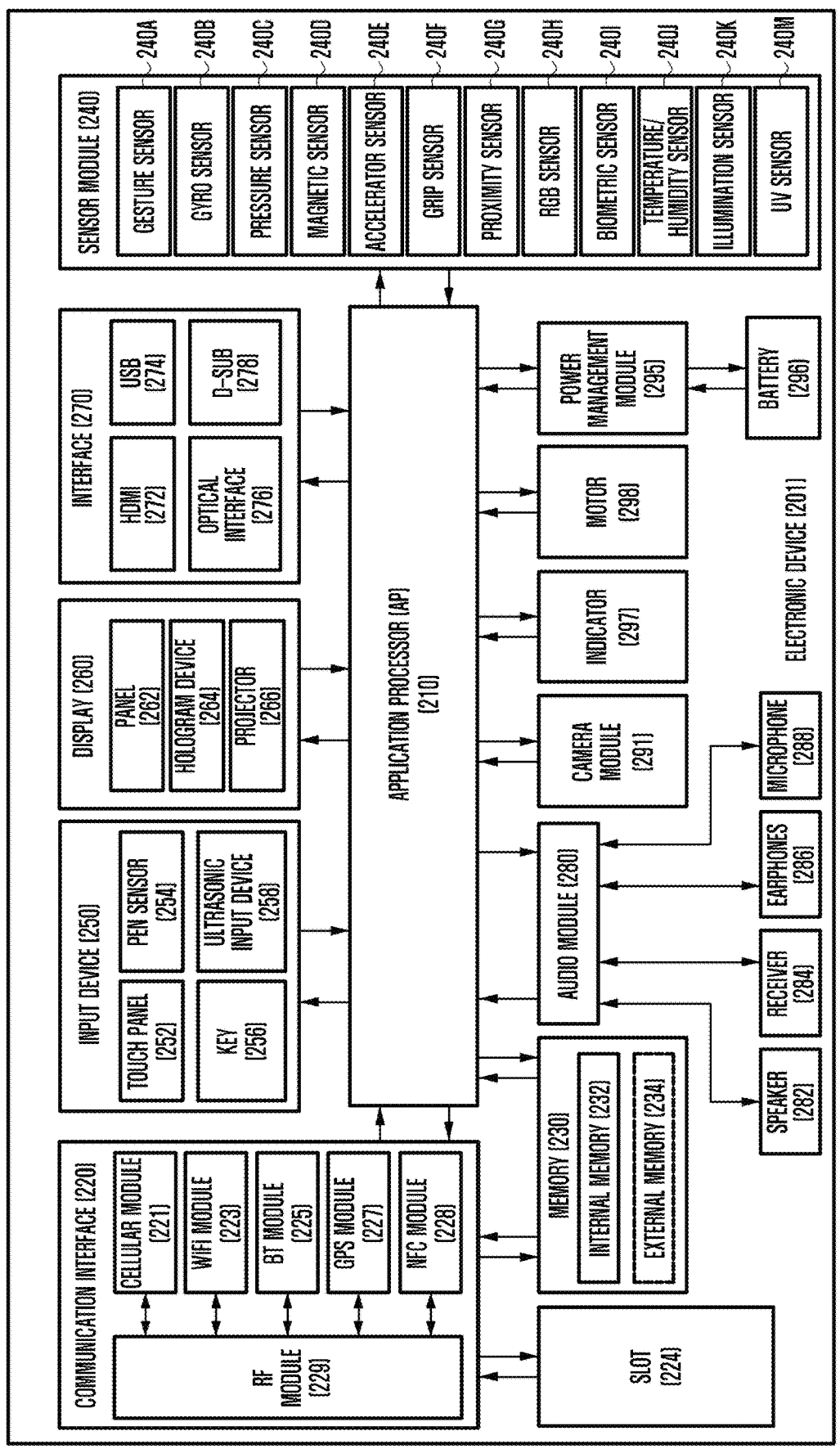
FIG. 2 illustrates a block diagram of an electronic device according to various embodiments of the present disclosure.

FIG. 2 is a block diagram illustrating an example electronic device according to various example embodiments of the present disclosure.

Referring to FIG. 2, an electronic device 201 may be, for example, the electronic device 101 illustrated in FIG. 1.

Referring to FIG. 2, the electronic device 201 may include a processor 210 (e.g., and application processor including processing circuitry), a subscriber identification module (SIM) card 224, a memory 230, a communication interface 220 (e.g., including communication circuitry), a sensor module 240, an input device 250 (e.g., including input circuitry), a display 260, an interface 270 (e.g., including interface circuitry), an audio module 280 (coder/decoder (codec)), a camera module 291, a power management module 295, a battery 296, an indicator 297, a motor 298 and any other similar and/or suitable components.

The processor 210 may include various processing circuitry, such as, for example, and without limitation, one or more of a dedicated processor, a CPU, application processors (APs) (not illustrated), or one or more communication processors (CPs) (not illustrated). The processor 210 may be, for example, the processor 120 illustrated in FIG. 1. The AP and the CP may be included in the processor 210 in FIG. 2, or may be included in different integrated circuit (IC) packages, respectively. According to an embodiment of the present disclosure, the AP and the CP may be included in one IC package.

The AP may execute an operating system (OS) or an application program, and thereby may control multiple hardware or software elements connected to the AP and may perform processing of and arithmetic operations on various data including multimedia data. The AP may be implemented by, for example, a system on chip (SoC). According to an embodiment of the present disclosure, the processor 210 may further include a graphical processing unit (GPU) (not illustrated).

The CP may manage a data line and may convert a communication protocol in the case of communication between the electronic device (e.g., the electronic device 101) including the electronic device 201 and different electronic devices connected to the electronic device through the network. The CP may be implemented by, for example, an SoC. According to an embodiment of the present disclosure, the CP may perform at least some of multimedia control functions. The CP, for example, may distinguish and authenticate a terminal in a communication network by using a SIM (e.g., the SIM card 224). In addition, the CP may provide the user with services, such as a voice telephony call, a video telephony call, a text message, packet data, and the like.

Further, the CP may control the transmission and reception of data by the communication interface 220. In FIG. 2, the elements, such as the power management module 295, the memory 230, and the like are illustrated as elements separate from the processor 210. However, according to an embodiment of the present disclosure, the processor 210 may include at least some of the above-described elements (e.g., the power management module 295).

According to an example embodiment of the present disclosure, the AP or the CP may load, to a volatile memory, a command or data received from at least one of a non-volatile memory and other elements connected to each of the AP and the CP, and may process the loaded command or data. In addition, the AP or the CP may store, in a non-volatile memory, data received from or generated by at least one of the other elements.

The SIM card 224 may be a card implementing a SIM, and may be inserted into a slot formed in a particular portion of the electronic device 201. The SIM card 224 may include unique identification information (e.g., IC card identifier (ICCID)) or subscriber information (e.g., international mobile subscriber identity (IMSI)).

The memory 230 may include an internal memory 232 and/or an external memory 234. The memory 230 may be, for example, the memory 130 illustrated in FIG. 1. The internal memory 232 may include, for example, at least one of a volatile memory (e.g., a dynamic random access memory (DRAM), a static RAM (SRAM), a synchronous dynamic RAM (SDRAM), and the like), and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a not AND (NAND) flash memory, a not OR (NOR) flash memory, and the like). According to an embodiment of the present disclosure, the internal memory 232 may be in the form of a solid state drive (SSD). The external memory 234 may further include a flash drive, for example, a compact flash (CF), a secure digital (SD), a micro-SD, a mini-SD, an extreme digital (xD), a memory stick, and the like.

The communication interface 220 may include various communication circuitry including, for example, and without limitation, a radio frequency (RF) module 229. The communication interface 220 may be, for example, the communication interface 170 illustrated in FIG. 1. The communication interface 220 may further include various communication circuitry including, for example, and without limitation, wireless communication modules to enable wireless communication through the RF module 229. The wireless communication modules may include, for example, and without limitation, a cellular module 221, a Wi-Fi module 223, a BT module 225, a GPS module 227, and/or a NFC module 228. Additionally or alternatively, the wireless communication modules may further include a network interface (e.g., a LAN card), a modulator/demodulator (modem), and the like for connecting the electronic device 201 to a network (e.g., the internet, a LAN, a WAN, a telecommunication network, a cellular network, a satellite network, a POTS, and the like) (not illustrated).

The communication interface 220 (e.g., the communication interface 170) may perform data communication with other electronic devices (e.g., the electronic devices 102 and 104, and the server 106) through a network (e.g., network 162).

The RF module 229 may be used for transmission and reception of data, for example, transmission and reception of RF signals or called electronic signals. Although not illustrated, the RF module 229 may include, for example, a transceiver, a power amplifier module (PAM), a frequency filter, a low noise amplifier (LNA), and the like. In addition, the RF module 229 may further include a component for transmitting and receiving electromagnetic waves in a free space in a wireless communication, for example, a conductor, a conductive wire, and the like.

The sensor module 240 may include, for example, at least one of a gesture sensor 240A, a gyro sensor 240B, an atmospheric pressure (e.g., barometer) sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance (e.g., light) sensor 240K, and an ultra violet (UV) sensor 240M. The sensor module 240 may measure a physical quantity or may detect an operating state of the electronic device 201, and may convert the measured or detected information to an electrical signal. Additionally/alternatively, the sensor module 240 may include, for example, an electronic nose (E-nose) sensor (not illustrated), an electromyography (EMG) sensor (not illustrated), an electroencephalogram (EEG) sensor (not illustrated), an electrocardiogram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein. The sensor module 240 may also, or in the alternative, be controlled by the processor 210.

The input device 250 may include various input circuitry, such as, for example, and without limitation, a touch panel 252, a pen sensor 254 (e.g., a digital pen sensor), keys 256, and an ultrasonic input device 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. In addition, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input device 258 enables the terminal to detect a sound wave by using a microphone (e.g., a microphone 288) of the terminal through a pen generating an ultrasonic signal, and to identify data. The ultrasonic input device 258 is capable of wireless recognition. According to an embodiment of the present disclosure, the electronic device 201 may receive a user input from an external device (e.g., a network, a computer, or a server), which is connected to the electronic device 201, through the communication interface 220.

The display 260 may include a panel 262, a hologram 264, and a projector 266. The display 260 may be, for example, the display 160 illustrated in FIG. 1. The panel 262 may be, for example, a liquid crystal display (LCD) and an active matrix organic light emitting diode (AM-OLED) display, or the like, but is not limited thereto. The panel 262 may be implemented so as to be, for example, flexible, transparent, or wearable. The panel 262 may include the touch panel 252 and one module. The hologram 264 may display a three-dimensional image in the air by using interference of light. The projector 266 may include light-projecting elements, such as LEDs, to project light into external surfaces. According to an embodiment of the present disclosure, the display 260 may further include a control circuit for controlling the panel 262, the hologram 264, or the projector 266.

The interface 270 may include various interface circuitry, such as, for example, and without limitation, a high-definition multimedia interface (HDMI) 272, a universal serial bus (USB) 274, an optical interface 276, and a d-subminiature (D-sub) 278. Additionally or alternatively, the interface 270 may include, for example, SD/multi-media card (MMC) (not illustrated) or infrared data association (IrDA) (not illustrated).

The audio module 280 (codec) may bidirectionally convert between a voice and an electrical signal. The audio module 280 may convert voice information, which is input to or output from the audio module 280, through, for example, a speaker 282, a receiver 284, an earphone 286, the microphone 288, and the like.

The camera module 291 may capture an image and a moving image. According to an embodiment of the present disclosure, the camera module 291 may include one or more image sensors (e.g., a front lens or a back lens), an image signal processor (ISP) (not illustrated), and a flash LED (not illustrated).

The power management module 295 may manage power of the electronic device 201. Although not illustrated, the power management module 295 may include, for example, a power management IC (PMIC), a charger IC, or a battery fuel gauge.

The PMIC may be mounted to, for example, an IC or an SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, and the like) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the electronic device 201 or a part of the electronic device 201 (e.g., the AP), for example, a booting state, a message state, a charging state and the like. The motor 298 may convert an electrical signal into a mechanical vibration.

Although not illustrated, the electronic device 201 may include a processing unit (e.g., a GPU) for supporting a module TV. The processing unit for supporting a module TV may process media data according to standards, such as, for example, digital multimedia broadcasting (DMB), digital video broadcasting (DVB), media flow, and the like. Each of the above-described elements of the electronic device 201 according to an embodiment of the present disclosure may include one or more components, and the name of the relevant element may change depending on the type of electronic device. The electronic device 201 according to an embodiment of the present disclosure may include at least one of the above-described elements. Some of the above-described elements may be omitted from the electronic device 201, or electronic device 201 may further include additional elements. In addition, some of the elements of the electronic device 201 according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," and the like. The "module" may be a minimum unit of a component formed as one body or a part thereof. The "module" may be a minimum unit for performing one or more functions or a part thereof. The "module" may be implemented mechanically or electronically. For example, the "module" according to an example embodiment of the present disclosure may include at least one of a dedicated processor, a CPU, an application-specific integrated circuit (ASIC) chip, a field-programmable gate array (FPGA), and a programmable-logic device for performing certain operations which have been known or are to be developed in the future.

Figure 3:
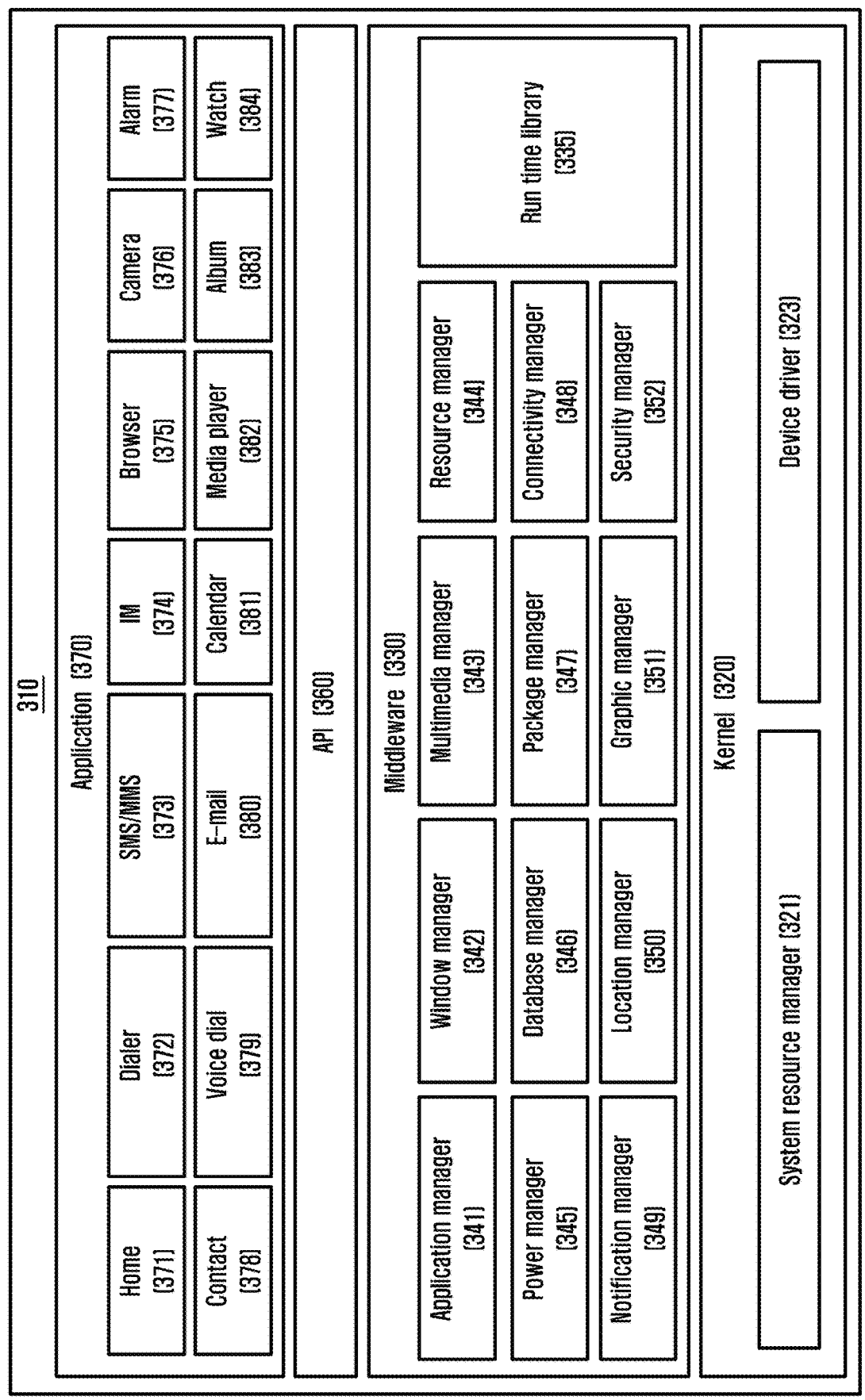
FIG. 3 illustrates a block diagram of a program module according to various embodiments of the present disclosure.

FIG. 3 is a block diagram illustrating an example configuration of a programming module according to an example embodiment of the present disclosure.

Referring to FIG. 3, a programming module 300 may be included (or stored) in the electronic device 101 (e.g., the memory 130) or may be included (or stored) in the electronic device 201 (e.g., the memory 230) illustrated in FIG. 1. At least a part of the programming module 300 may be implemented in software, firmware, hardware, or a combination of two or more thereof. The programming module 300 may be implemented in hardware (e.g., the electronic device 201), and may include an OS controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 300 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). In addition, according to an embodiment of the present disclosure, the device driver 323 may include an inter-process communication (IPC) driver (not illustrated).

The middleware 330 may include multiple modules previously implemented so as to provide a function used in common by the applications 370. In addition, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity, such as, for example, Wi-Fi and BT. The notification manager 349 may display or report, to the user, an event, such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. In addition, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the processor 210), the one or more processors may perform functions corresponding to the instructions. The non-transitory computer-readable storage medium may be, for example, the memory 230. At least a part of the programming module 300 may be implemented (e.g., executed) by, for example, the processor 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. In addition, some of the operations may be omitted, or other operations may be added to the operations.

Figure 4A:
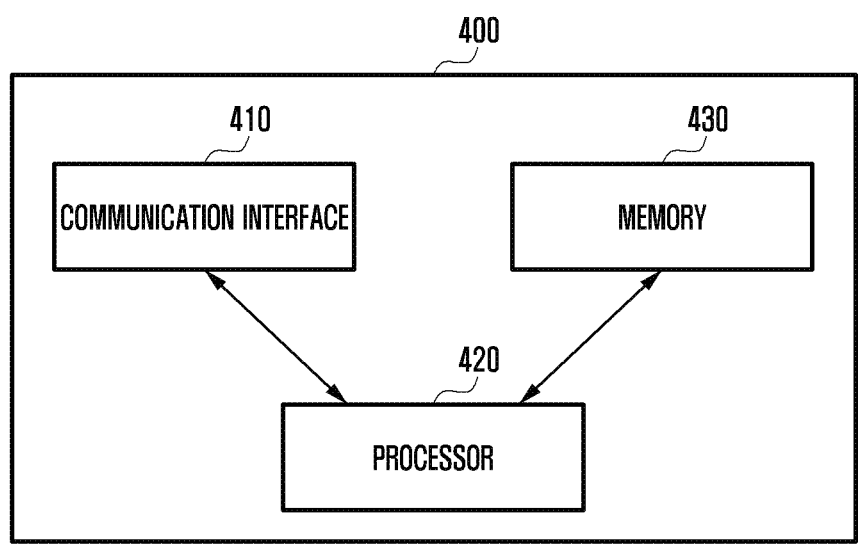
FIG. 4A illustrates a block diagram of an electronic device according to various embodiments of the present disclosure.

FIG. 4A is a block diagram of an electronic device according to various embodiments of the present disclosure.

With reference to FIG. 4A, in various embodiments of the present disclosure, the electronic device 400 may include a communication interface 410, a processor 420, and a memory 430.

In various embodiments, the electronic device 400 may perform speech recognition by use of an acoustic model and a language model.

The acoustic model may refer to a database in which feature vectors obtained by processing speech data and groups of phoneme candidates including phonemes corresponding to the feature vectors are mapped and stored.

For example, when the user speaking Korean utters speech sounds "na nun gan da" ("I'm going" in English), the external electronic device may generate speech data corresponding to "na nun gan da" and transmit the speech data to the electronic device 400.

The processor 420 may use the acoustic model to generate phonemes "n/a/n/(un or ung)/g/an/d/a" corresponding to the speech data. The acoustic model may store a group of phoneme candidates "un" and "ung" for the final "n" in speech data "nun".

The language model may refer to a database that stores information used to model linguistic order relations between words or syllables on the basis of phonemes corresponding to the speech data extracted from the acoustic model. The language model may store mappings between speech data and words including phonemes contained in a group of phoneme candidates. In addition, the language model may store the probability that each word containing the phonemes included in the phoneme candidate group match the speech data. The processor 420 may select a word corresponding to the speech data on the basis of the probabilities that individual words containing the phonemes included in the phoneme candidate group match the speech data.

The processor 420 may select a word having the highest probability of matching speech sounds of the user among the words corresponding to the phonemes included in the phoneme candidate group by use of the language model and perform speech recognition using the selected word. For example, among the words "nun" and "nung" containing "n", the processor 420 may determine that the word "nun" has the highest probability of matching speech sounds of the user by use of the language model.

As another example, when the user speaking English utters speech sounds "sin", the external electronic device may generate speech data corresponding to the speech sounds and transmit the speech data to the electronic device 400.

The processor 420 may use the acoustic model to generate phonemes "s/(i or ee)/n" corresponding to the speech data. The acoustic model may store a group of phoneme candidates "i" and "ee" for speech data "i".

The processor 420 may select a word having the highest probability of matching speech sounds of the user among the words "sin" and "seen" corresponding to the phonemes included in the phoneme candidate group by use of the language model and perform speech recognition using the selected word. For example, among the word "sin" corresponding to "i" and the word corresponding to "ee", the processor 420 may use the language model to select the word "sin" with the highest probability of matching speech sounds of the user for speech recognition.

In various embodiments, the electronic device 400 may construct the language model on the basis of user information in order to perform speech recognition using speech data of the user received through the communication interface 410. Next, a description is given of constructing the language model based on user information.

The communication interface 410 may communicate with an external electronic device (not shown) to receive speech data and user information from the external electronic device.

The speech data may refer to data associated with speech uttered by the user of the external electronic device. For example, the speech data may be data obtained by converting speech sounds uttered by the user into a digital signal for speech recognition. Here, the speech data may include data on the waveform, pitch and phase of the speech sound uttered by the user.

The user information may refer to information about the user of the external electronic device. In various embodiments, the user information may include an identifier of the external electronic device and context information.

In various embodiments, the context information may include various information about the user of the external electronic device, such as gender, age, location of the external electronic device, and application used at the time of receiving speech data.

The memory 430 may store various models such as the language model and acoustic model for speech recognition, and data related to the models. In various embodiments, the memory 430 may store a common language model commonly available to users, first language models differently specified for different users, a second language model related to context information of a user, and a third language model related to the time when the speech data is received.

The common language model may be a language model created by using data based on words and sentence patterns commonly used by users. The common language model may refer to any language model available to all users regardless of specific user information. In various embodiments, the common language model may be a default language model available to any user for speech recognition. The common language model may be periodically updated according to user selection or preconfigured settings.

The first language model may be a language model generated by using user information that is collected and transmitted by the external electronic device. User information may be transmitted to the electronic device 400 and used to construct the first language model when the external electronic device communicates with the electronic device 400 (communication for speech recognition or other purpose).

In various embodiments, the first language model may include detailed language models associated with user information. Each detailed language model may store mappings between words related to user information and groups of phoneme candidates.

The first language model may be constructed differently according to user information, such as the list of contacts stored in the external electronic device, the list of applications installed in the external electronic device, and the usage history of the keypad of the external electronic device.

The fact that the first language model is constructed differently may mean that the probability that a word included in the first language model matches the speech data is set differently according to user information. A detailed description on constructing the first language model will be given in connection with FIGS. 5A and 5B. In various embodiments, since the first language model is constructed using different user information for each user, it is possible to configure different first language models for different users.

The second language model may be a language model in which, according to context information included in the user information, the probability that words related to the context information match the speech data differs from the probability that words unrelated to the context information match the speech data. The context information used for constructing the second language model may indicate context information collected at the time when the user initiates speech recognition. Context information may be collected by the external electronic device and transmitted to the electronic device 400 along with the speech data. Whereas the first language model may be constructed using user information collected even when the user does not perform speech recognition, the second language model may be constructed using context information collected when the user initiates speech recognition.

The context information may refer to information that covers various situations of the user at the time when the user initiates speech recognition. In various embodiments, the context information may include information on the location of the external electronic device when the user initiates speech recognition, information on the time of the day when speech recognition is performed (e.g. morning, afternoon, evening), information on the application used when speech recognition is performed (e.g. camera, gallery, web browser), and personal information of the user (e.g. gender, age).

In various embodiments, the second language model may include a plurality of detailed language models. A detailed language model may store the probability that words related to context information match the speech data. The multiple detailed language models may correspond respectively to the pieces of context information. Upon reception of context information, the processor 420 may identify the detailed language models corresponding to the context information among the multiple detailed language models, and combine the identified detailed language models to construct the second language model. The second language model is described in more detail later with reference to FIG. 6.

The third language model may be a language model that includes words collected by the electronic device for a preset period of time from the time when the speech data is received by the electronic device. In various embodiments, the third language model may refer to a language model in which the probability that words match the speech data is set differently according to the frequencies of words used for the preset period of time from the time when speech recognition is performed.

In various embodiments, in the third language model, the probability that words or phrases related to buzzwords or issues at the time when speech recognition is performed match the speech data is set higher than that of other words. The third language model can be simultaneously loaded when the common language model is loaded for speech recognition, and the loaded third language model can be used for speech recognition in combination with the common language model.

In various embodiments, the preset period of time may be changed according to user settings. The third language model is described in more detail later with reference to FIG. 7.

In various embodiments, the processor 420 may identify a first language model corresponding to the identifier of the external electronic device (information that can distinguish between the external electronic device and other electronic devices, such as the MAC address or IMEI information of the external electronic device) included in the user information among the first language models stored in the memory 430. The processor 420 may construct the second language model by combining the detailed language models using the context information included in the user information. The processor 420 may construct a third language model in accordance with the point in time when speech recognition is performed.

The processor 420 may combine at least one of the first language model, the second language model, and the third language model with the common language model to construct the integrated language model. The processor 420 can perform speech recognition by inputting speech data into the integrated language model and output speech recognition results.

The processor 420 may input speech data into the individual language models of the integrated language model to extract words matching the speech data, identify the probability of each extracted word (probability of matching the speech data), select one of the extracted words according to the weights assigned to the language models, and outputs a speech recognition result on the basis of the selected word.

In one embodiment, the processor 420 may be configured to include a language model generator (not shown) to generate an integrated language model by combining at least one of the first language model, the second language model, and the third language model with the common language model, and a speech recognizer (not shown) to perform speech recognition by using the integrated language model and the speech data transmitted from the user terminal and output speech recognition results.

The integrated language model may be generated by combining the common language model and one or more detailed language models. The detailed language models combined with the common language model may vary in type depending on user information and context information. The form of combining the detailed language models with the common language model can also be varied depending on the detailed language models.

It is assumed that the integrated language model includes the first language model, the second language model, the third language model, and the common language model. When the user of the external electronic device pronounces a counterpart name "anne" contained in the stored contacts, the external electronic device may pick up a speech signal of the user, generate speech data, and transmit the speech data to the electronic device 400.

The processor 420 may input the speech data to the first language model, the second language model, the third language model, and the common language model.

The processor 420 may generate the first language model on the basis of a list of users included in the contacts stored in the external electronic device. In various embodiments, the processor 420 may generate the first language model such that the probability that a word included in the user list matches the speech data is higher than the probability that a word not included in the user list matches the speech data. Assuming that the first language model contains data indicating that the probability that "anne" matches the speech data is 90 percent and the probability that "and" matches the speech data is 10 percent, when the first language model is used, the processor 420 may produce a speech recognition result indicating that the probability of being "anne" is 90 percent.

Assuming that the second language model contains data indicating that the probability that "anne" matches the speech data is 80 percent and the probability that "and" matches the speech data is 20 percent, when the second language model is used, the processor 420 may produce a speech recognition result indicating that the probability of being "anne" is 80 percent.

Assuming that the third language model contains data indicating that the probability that "anne" matches the speech data is 30 percent and the probability that "and" matches the speech data is 70 percent, when the third language model is used, the processor 420 may produce a speech recognition result indicating that the probability of being "and" is 70 percent.

Assuming that the common language model contains data indicating that the probability that "anne" matches the speech data is 40 percent and the probability that "and" matches the speech data is 60 percent, when the common language model is used, the processor 420 may produce a speech recognition result indicating that the probability of being "and" is 60 percent.

The above description is summarized in the following table.

TABLE 1

|  | Probability of being recognized as "anne" | Probability of being recognized as "and" | Weight | Probability of being recognized as "anne" in consideration of weight | Probability of being recognized as "and" in consideration of weight |
| --- | --- | --- | --- | --- | --- |
| First language model | 90% | 10% | 0.3 | 0.9*0.3 = 0.27 | 0.1*0.3 = 0.03 |
| Second language model | 80% | 20% | 0.2 | 0.8*0.2 = 0.16 | 0.2*0.2 = 0.04 |
| Third language model | 30% | 70% | 0.1 | 0.3*0.1 = 0.03 | 0.7*0.1 = 0.07 |
| Common language model | 40% | 60% | 0.4 | 0.4*0.4 = 0.16 | 0.6*0.4 = 0.24 |

The processor 420 may input speech data into the language models included in the integrated language model, identify the output words or phrases, and select one of the words according to the weights assigned to the language models.

In various embodiments, the weight may be assigned to the language models used in the speech recognition process, and may indicate the level of credibility for speech recognition results output by the language models.

In various embodiments, the processor 420 may compare a value obtained by adding the probabilities of being recognized as "anne" in consideration of the weight with another value obtained by adding the probabilities of being recognized as "and" in consideration of the weight, and select the word associated with the larger value, and output the selected word as the speech recognition result.

TABLE 2

| | Result |
|---|---|
| Probability of being recognized as "anne" | 0.27 + 0.16 + 0.03 +0.16 = 0.62 |
| Probability of being recognized as "and" | 0.0 3+ 0.04 + 0.07 + 0.24 = 0.38 |

Referring to Tables 1 and 2, when the integrated language model is used, it can be seen that the probability of the speech data matching "anne" is 0.62 and the probability of the speech data matching "and" is 0.38. Among the extracted words ("anne", "and"), the processor 420 may select the word predicted to have a higher probability of matching the input speech data ("anne"), and output the speech recognition result based on the selected word.

In various embodiments, the processor 420 may compare values obtained by adding the highest probabilities among the probabilities for recognizing word candidates produced by each language model, and select the word associated with a larger one of the values to output the speech recognition result.

TABLE 3

| | Result |
|---|---|
| Probability of being recognized as "anne" | 0.27 + 0.16 = 0.43 |
| Probability of being recognized as "and" | 0.07 + 0.24 = 0.31 |

With reference to Tables 1 and 3, it can be seen that, in the first language model, the probability of being recognized as "anne" (0.27) is higher than the probability of being recognized as "and" (0.03). It can be seen that, in the second language model, the probability of being recognized as "anne" (0.16) is higher than the probability of being recognized as "and" (0.04). It can be seen that, in the third language model, the probability of being recognized as "anne" (0.03) is lower than the probability of being recognized as "and" (0.07). It can be seen that, in the common language model, the probability of being recognized as "anne" (0.16) is lower than the probability of being recognized as "and" (0.24). The processor 420 may compare the value (0.43) obtained by adding the probability of being recognized as "anne" by the first language model (0.27) and the probability of being recognized as "anne" by the second language model (0.16) with the value (0.31) obtained by adding the probability of being recognized as "and" by the third language model (0.07) and the probability of being recognized as "and" by the common language model (0.24). Among the extracted words ("anne", "and"), the processor 420 may select the word with a higher probability of matching the speech data ("anne") to output the speech recognition result.

In various embodiments, the weights may be assigned differently according to user settings. In the above example, the first language model, the second language model, and the third language model are combined with the common language model to generate the integrated language model. However, the present disclosure is not limited thereto. In the present disclosure, at least one of the first language model, the second language model, and the third language model may be combined with the common language model to generate the integrated language model.

In various embodiments, the processor 420 may control the communication interface 410 to send the speech recognition result to the external electronic device.

Figure 4B:
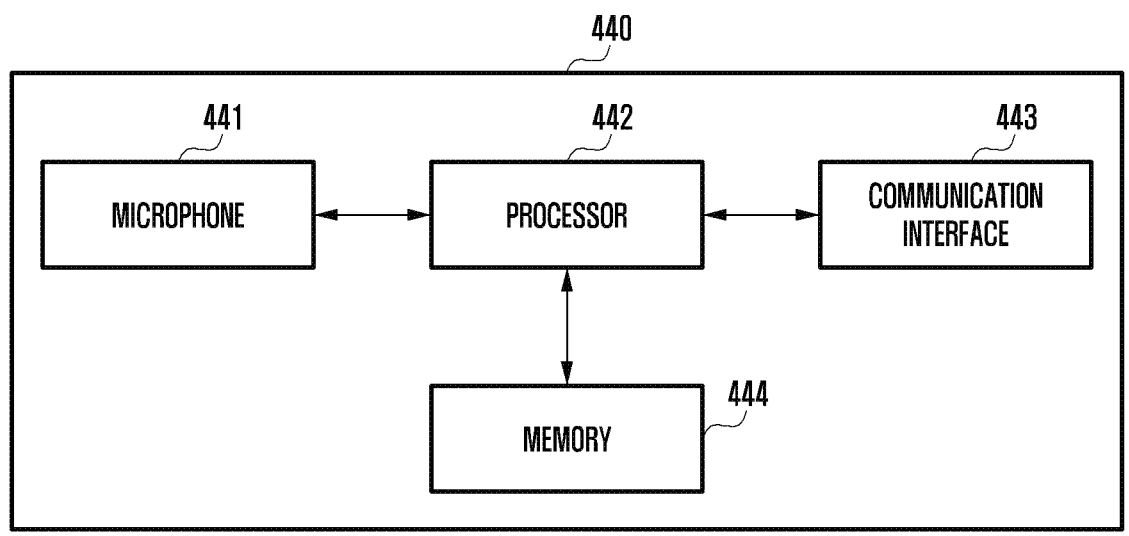
FIG. 4B illustrates a block diagram of an external electronic device according to various embodiments of the present disclosure.

FIG. 4B is a block diagram of an external electronic device according to various embodiments of the present disclosure.

With reference to FIG. 4B, in various embodiments, the external electronic device 440 may include a microphone 441, a processor 442, a communication interface 443, and a memory 444.

The external electronic device 440 may correspond to a mobile terminal used by the user. The user may utter speech sounds to utilize various functions supported by the external electronic device 440.

The microphone 441 may pick up a speech signal of the user and convert the speech signal into speech data.

The communication interface 443 may communicate with the electronic device 400. In various embodiments, the communication interface 443 may transmit speech data converted by the microphone 441 and user information to the electronic device 400.

The processor 442 may control the communication interface 443 to transmit speech data and user information to the electronic device 400 shown in FIG. 4A. In various embodiments, the user information may include the usage history of the keypad. The processor 442 may extract words entered by the user through the keypad and control the communication interface 443 to send a list of the extracted words to the electronic device 400.

The memory 444 may store various data, such as speech data corresponding to the speech signal of the user picked up by the microphone 441, user information, and context information extracted when speech recognition is performed.

The electronic device 400 may receive the list of extracted words and construct the first language model based on the word list. Constructing the first language model is described in detail with reference to FIG. 5A. In various embodiments, the electronic device 400 may perform speech recognition on the basis of the speech data transmitted by the external electronic device 440 and the language model, and transmit the speech recognition result to the external electronic device 440. The processor 442 may receive the speech recognition result and output the speech recognition result. In various embodiments, the processor 442 may control various functions of the external electronic device 440 on the basis of the speech recognition result.

In FIG. 4B, speech recognition is described as being performed by a separate server (e.g. electronic device 400 of FIG. 4A). However, the external electronic device 440 of FIG. 4B may directly perform speech recognition. To this end, the memory 444 may store a common language model, a first language model, a second language model, and a third language model. The memory 444 may further store computer codes for creating an integrated language model, computer codes for performing speech recognition, and the like. The processor 442 may generate an integrated language model using the language models stored in the memory 444 and may perform speech recognition by use of the generated integrated language model and speech data.

Figure 5A:
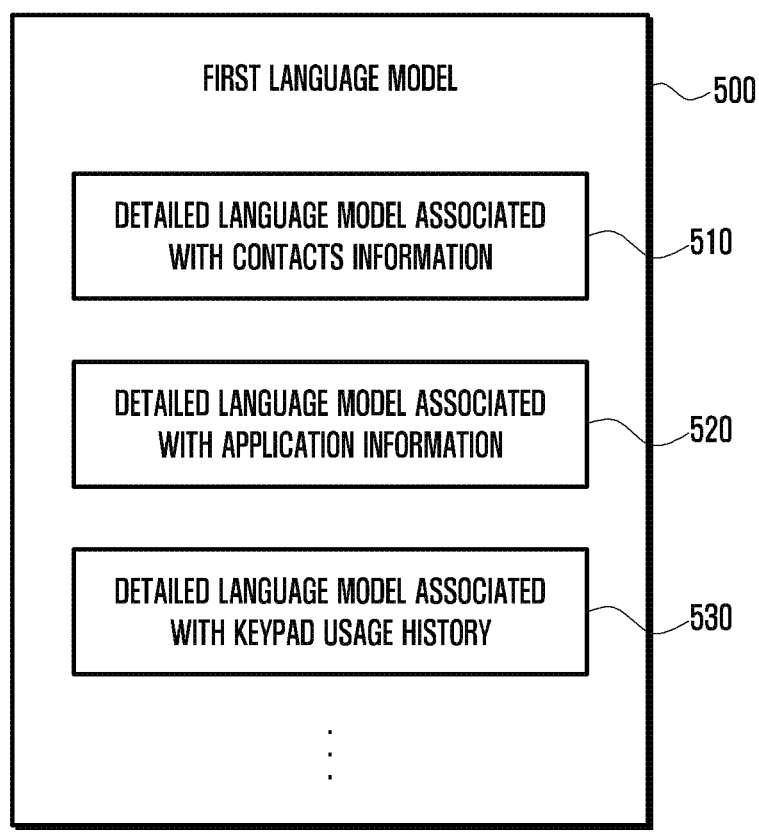
FIGS. 5A and 5B illustrate a first language model of the electronic device according to various embodiments of the present disclosure.

FIG. 5A illustrates a first language model of the electronic device according to various embodiments of the present disclosure.

With reference to FIG. 5A, the first language model may include a detailed language model 510 related to contact information, a detailed language model 520 related to application information, and a detailed language model 530 related to keypad usage history information.

As described before, the first language model 500 can be generated for each user who performs speech recognition, and the first language model 500 can be generated differently for different user information. In various embodiments, the processor 420 may receive user information, extract frequently used words/phrases from the user information, and generate the first language model 500 using the extracted words/phrases.

The detailed language model 510 related to contact information of the first language model 500 may include a list of contacts stored in the external electronic device used by the user and a list of words/phrases frequently used during communication with contacts of the contact list. In various embodiments, in the detailed language model 510, the probability that the input speech data matches words/phrases frequently used during communication with a particular contact may be set higher than the probability that the input speech data matches other words/phrases. In various embodiments, in the detailed language model 510, the probability that the input speech data matches words/phrases belonging to the contact list stored in the external electronic device may be set higher than the probability that the input speech data matches other words/phrases (not belonging to the contact list).

The detailed language model 520 related to application information may include a list of applications used by the user and a list of words/phrases frequently entered through various input means (e.g. keypad, speech input) during usage of applications. The detailed language model 520 may further include data on usage frequencies of applications. In various embodiments, in the first language model 500, the probability that speech data entered during usage of a specific application matches words/phrases frequently entered during usage of the specific application may be set higher than the probability that such input speech data matches other words/phrases.

The detailed language model 530 related to keypad usage history information may include a list of words/phrases entered by the user through the keypad. In various embodiments, in the first language model 500, the probability that the input speech data matches words/phrases belonging to the keypad usage history may be set higher than the probability that the input speech data matches other words/phrases.

To generate the detailed language model 530 related to keypad usage history information, the processor 420 may collect data including words/phrases entered through the keypad from the external electronic device.

The processor 420 may apply text normalization to the collected data to remove words/sentences including non-canonical expressions and incorrect words (e.g. typos). The processor 420 may separate words included in the sentence and converts them into a form suitable for data mining, and perform a data mining operation to extract keypad input patterns of the user. In various embodiments, keypad input patterns of the user may be obtained by i) extracting T frequently used words from the accumulated data, ii) extracting M words frequently used on a monthly basis and extracting W words frequently used on a weekly basis in order to reflect new words and trends, and iii) combining the T frequently used words, the M words frequently used on a monthly basis, and the W words frequently used on a weekly basis. The extracted words may be applied to the detailed language model 530.

Figure 5B:
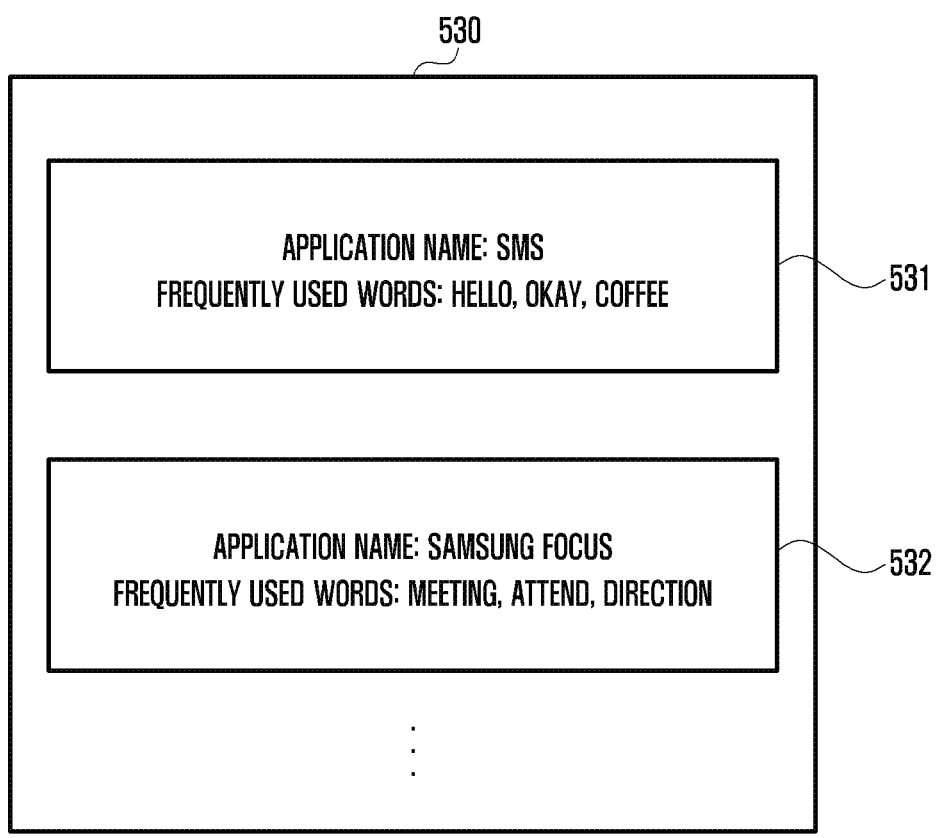

FIG. 5B illustrates a detailed language model 530 related to the keypad usage history in the electronic device according to various embodiments of the present disclosure.

As shown in FIG. 5B, in the detailed language model 530, frequently entered words/phrases through the keypad may be arranged on the basis of a specific application using the keypad.

For a short message service (SMS) application, the words frequently entered through the keypad may include "hello", "okay" and "coffee" as indicated by indicia 531.

For the Samsung Focus application, the words frequently entered through the keypad may include "meeting", "attend", and "direction".

As described before in connection with FIG. 5A, in various embodiments, in the detailed language model 530 related to the keypad usage history, the probability that the input speech data matches words/phrases frequently entered through the keypad may be set higher than the probability that the input speech data matches other words/phrases. In addition, the processor 420 can identify the identifier of an application (e.g. SMS program) used in the external electronic device for speech recognition. In the detailed language model 530 corresponding to an application identifier, the probability that the input speech data matches words/phrases stored in accordance with the application identifier (e.g. "hello", "okay", "coffee") may be set higher than the probability that the input speech data matches other words/phrases.

In FIG. 5B, an SMS application is shown. However, the present disclosure is not limited thereto. Various types of applications supporting the keypad may also be applied in the present disclosure.

In various embodiments, in the first language model 500, the probability that the input speech data matches words/phrases belonging to the keypad usage history be set higher than the probability that the input speech data matches other words/phrases. For example, assuming that the user enters "sin" more frequently than "seen" on the SMS through the keypad, the probability that the word "sin" contained in the first language model matches the speech data may be set to 75 percent, and the probability that the word "seen" matches the speech data may be set to 25 percent. As another example, assuming that the user enters "seen" more frequently than "sin" on the SMS through the keypad, the probability that the word "seen" contained in the first language model matches the speech data may be set to 75 percent, and the probability that the word "sin" matches the speech data may be set to 25 percent. Therefore, since the user uses "seen" more frequently on the SMS, it is possible to induce the language model to produce a speech recognition result conforming to the user's intention, improving the accuracy of speech recognition.

In various embodiments, for applications used to communicate with counterpart users, frequently used words/phrases during communication may be classified according to the counterpart users for storage in the detailed language model 530. For example, when the user of the external electronic device transmits and receives messages to and from a counterpart user A and a counterpart user B through an SMS application, the words/phrases frequently used for the counterpart user A and the words/phrases frequently used for the counterpart user B may be separately stored. Thereby, the electronic device 400 can correctly recognize the tone and language of each user by use of the first language model 500.

Figure 6:
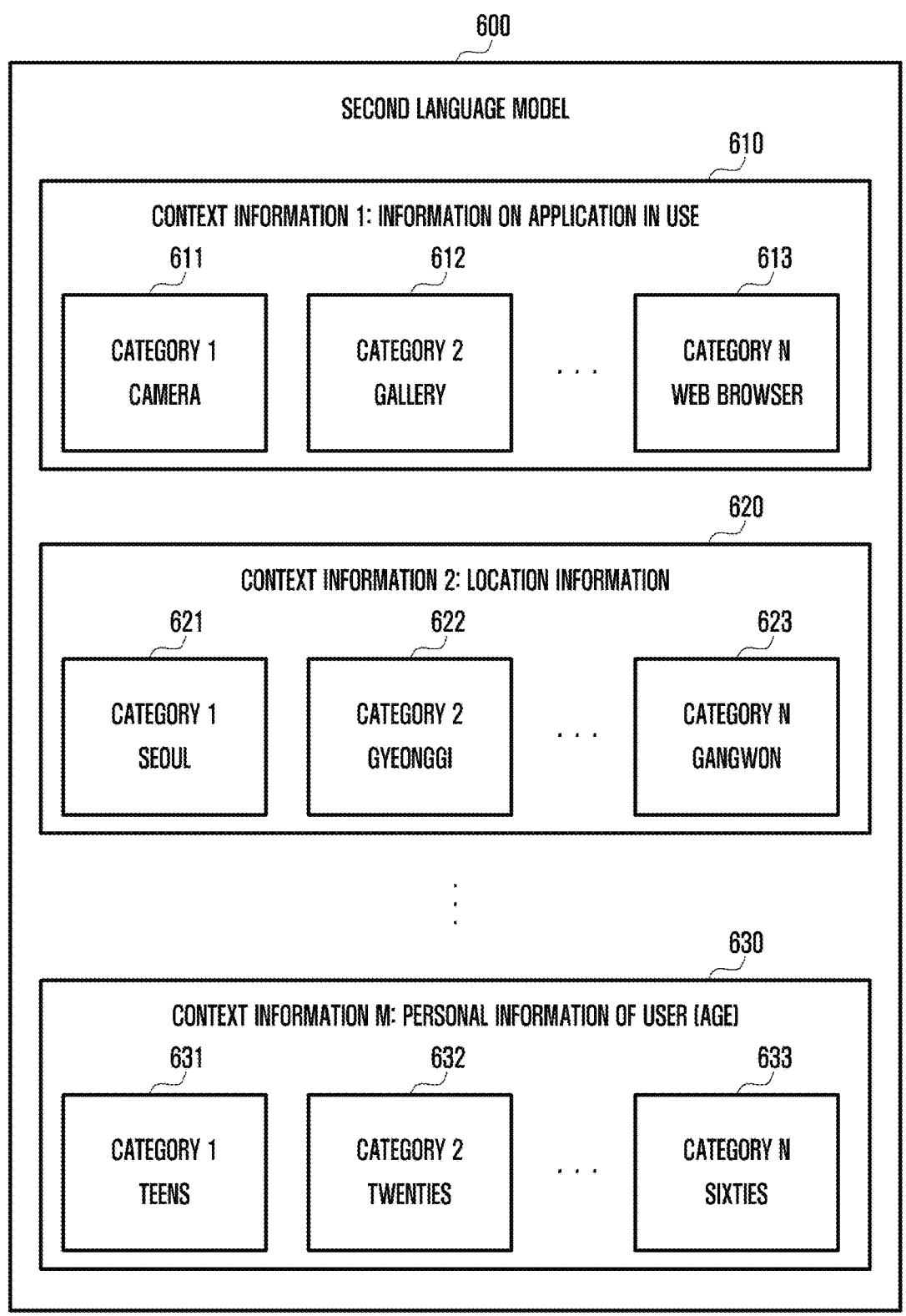
FIG. 6 illustrates a second language model of the electronic device according to various embodiments of the present disclosure.

FIG. 6 illustrates a second language model of the electronic device according to various embodiments of the present disclosure.

As shown in FIG. 6, the second language model 600 may include multiple detailed language models 611 to 633. The multiple detailed language models may be classified according to the type of context information.

In accordance with application information 610 of the context information, there may be a detailed model 611 usable for the camera application, a detailed model 612 usable for the gallery application, and a detailed model 613 usable for the web browser. In each of the detailed models 611 to 613, the probability that the input speech data matches words/phrases used along with the corresponding application (e.g., the word "shooting" may be frequently used along with the camera application) may be set higher than the probability that the input speech data matches other words/phrases. In various embodiments, the electronic device 400 may extract information on the application in use from the context information transmitted by the external electronic device and select detailed models corresponding to the extracted application information. The selected detailed models can be used to construct the integrated language model. Accordingly, the electronic device 400 can more accurately recognize a word or phrase frequently used in a specific application (e.g., the word "shooting" can be frequently used along with the camera application).

In accordance with location information 620 of the external electronic device in the context information, there may be a detailed model 621 usable in the Seoul area, a detailed model 622 usable in the Gyeonggi area, and a detailed model 623 usable in the Gangwon area. In each of the detailed models 621 to 623, the probability that the input speech data matches words/phrases frequently used in the corresponding geographical area (e.g. regional dialect) may be set higher than the probability that the input speech data matches other words/phrases. In various embodiments, the electronic device 400 may select detailed models corresponding to the location information of the external electronic device and construct the integrated language model by using the selected detailed models. Accordingly, the electronic device 400 can more accurately recognize a word or phrase frequently used in a specific geographical area.

In accordance with personal information 630 of the user in the context information, there may be a detailed model 631 usable for the age group of teens, a detailed model 632 usable for the age group of twenties, and a detailed model 633 usable for the age group of sixties. In each of the detailed models 631 to 633, the probability that the input speech data matches words/phrases frequently used in the corresponding age group (e.g. words frequently used by teenagers) may be set higher than the probability that the input speech data matches other words/phrases.

In various embodiments, the electronic device 400 may select detailed models corresponding to the personal information of the user of the external electronic device and construct the integrated language model by using the selected detailed models. Accordingly, the electronic device 400 can more accurately recognize a word or phrase predicted to be frequently used by the user.

In various embodiments, the processor 420 may receive context information and select detailed models corresponding to the context information. The selected detailed models may be used to construct a second language model. The second language model may be used to construct an integrated language model.

Figure 7:
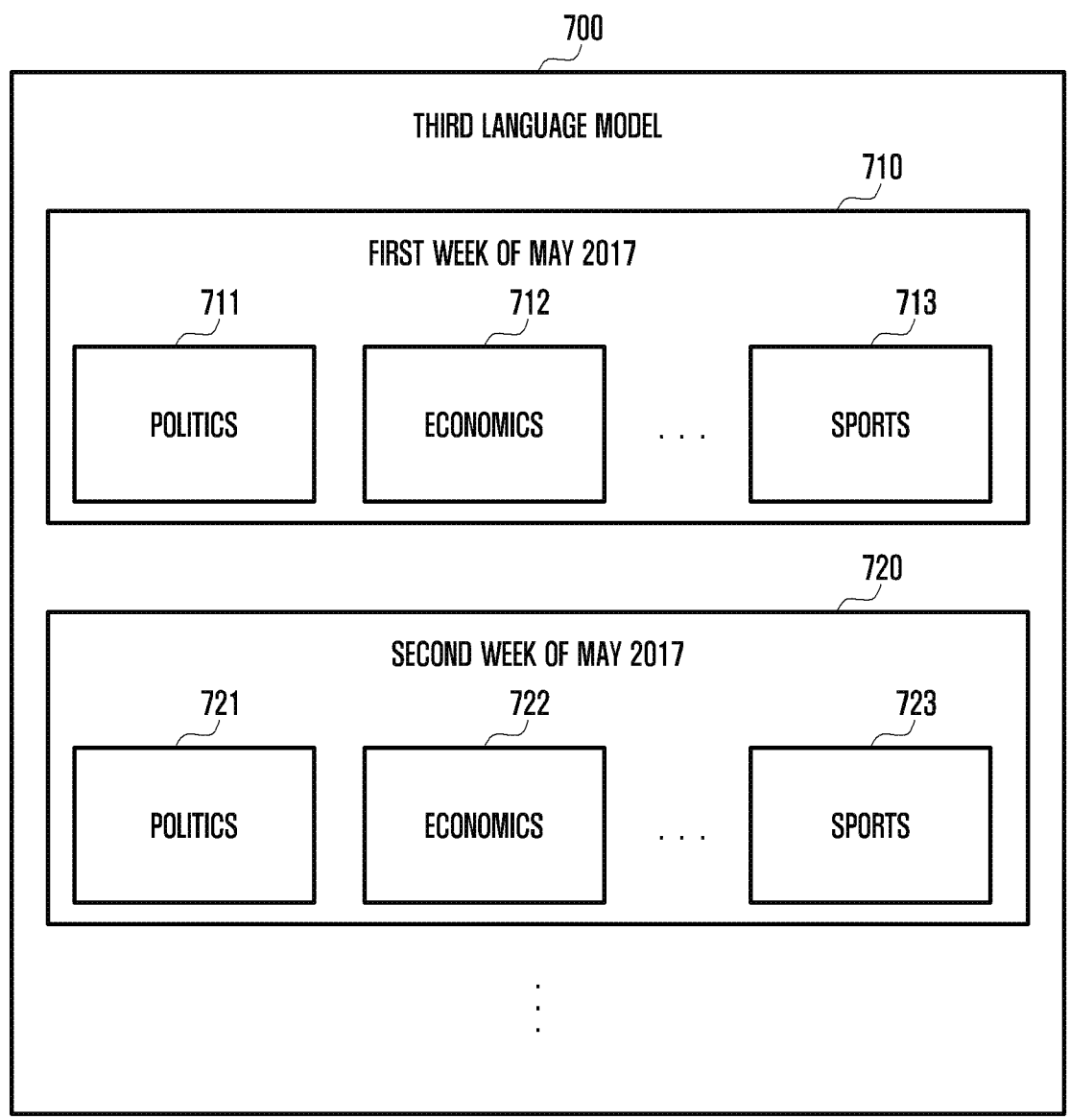
FIG. 7 illustrates a third language model of the electronic device according to various embodiments of the present disclosure.

FIG. 7 illustrates a third language model of the electronic device according to various embodiments of the present disclosure.

As shown in FIG. 7, the third language model 700 may be composed of detailed models 710 and 720 for different time periods.

Each of the detailed models 710 and 720 may store words that are frequently used during the time period when the user initiates speech recognition. For example, the third language model 700 may include a detailed model 710 storing words frequently used on the first week of May 2017, and a detailed model 720 storing words frequently used on the second week of May 2017.

In the detailed models 710 and 720 of the third language model, frequently used words may be classified according to specific fields (e.g., politics 711 and 721, economics 712 and 722, sports 713 and 723).

In various embodiments, the processor 420 of the electronic device may select detailed models corresponding to the time period when speech recognition is conducted indicated by the user information, and use the selected detailed models to construct a third language model. The third language model may be used to construct an integrated language model. Accordingly, the electronic device 400 can more accurately recognize a word or phrase predicted to be frequently used during the time period when the user initiates speech recognition (e.g. buzzword).

According to various embodiments of the present disclosure, an electronic device may include: a communication interface to receive speech data of the user and user information from an external electronic device; a memory to store a common language model used by default for speech recognition, a first language model designated for each user, a second language model associated with context information of each user, and a third language model associated with words collected by the electronic device for a preset period of time from the reception time of the speech data; and a processor to perform a procedure of combining at least one of the first language model, the second language model, and the third language model with the common language model to construct an integrated language model, performing speech recognition on the basis of the speech data and the integrated language model, and outputting a speech recognition result corresponding to the speech data.

In one embodiment, the processor of the electronic device may identify words extracted using the individual language models of the integrated language model, select one of the extracted words according to the weights assigned to the individual language models, and output a speech recognition result on the basis of the selected word.

In one embodiment, the processor of the electronic device may identify words extracted using the individual language models of the integrated language model, select, if the extracted words are different, one of the extracted words according to the weights assigned to the individual language models, and output a speech recognition result on the basis of the selected word.

In one embodiment, the first language model may be a language model in which the probability that a word contained in the first language model matches the speech data is set differently according to at least one of a list of applications installed in the external electronic device, a keypad usage history of the external electronic device, a list of contacts stored in the external electronic device, and a playlist of music files stored in the external electronic device.

In one embodiment, the first language model may be a language model in which the probability that a word contained in the first language model matches the speech data is set differently according to the counterpart with which the user of the external electronic device has communicated.

In one embodiment, the processor may select one or more detailed language models corresponding to context information of the user information among multiple detailed language models contained in the second language model and use the selected detailed language models to construct a new second language model.

In one embodiment, the second language model may be a language model in which the probability that a word contained in the second language model matches the speech data is set differently according to the context information.

In one embodiment, the context information may include at least one of information on the application running on the external electronic device, information on the time at which the speech data is received, information on the location of the external electronic device, and personal information of the user.

In one embodiment, the third language model may be a language model in which the probability that a word contained in the third language model matches the speech data is set differently according to the usage frequencies during a preset period of time from the time when the speech data is received.

According to another embodiment of the present disclosure, an electronic device may include: a microphone to pick up a speech signal of the user and convert the speech signal into speech data; a communication interface to transmit the speech data to an external electronic device; a memory to store the speech data, user information, and context information; and a processor to perform a procedure of extracting words entered by the user through the keypad, controlling the communication interface to send a list of the extracted words to the external electronic device, controlling the communication interface to receive a speech recognition result from the external electronic device, and outputting the speech recognition result, wherein the speech recognition result is produced on the basis of the speech data and an integrated language model that is constructed by combining at least one of a first language model constructed based on the list of words, a second language model constructed based on the context information of the user, and a third language model constructed based on words collected by the external electronic device for a preset period of time from the transmission time of the speech data with a common language model used by default for speech recognition.

Figure 8:
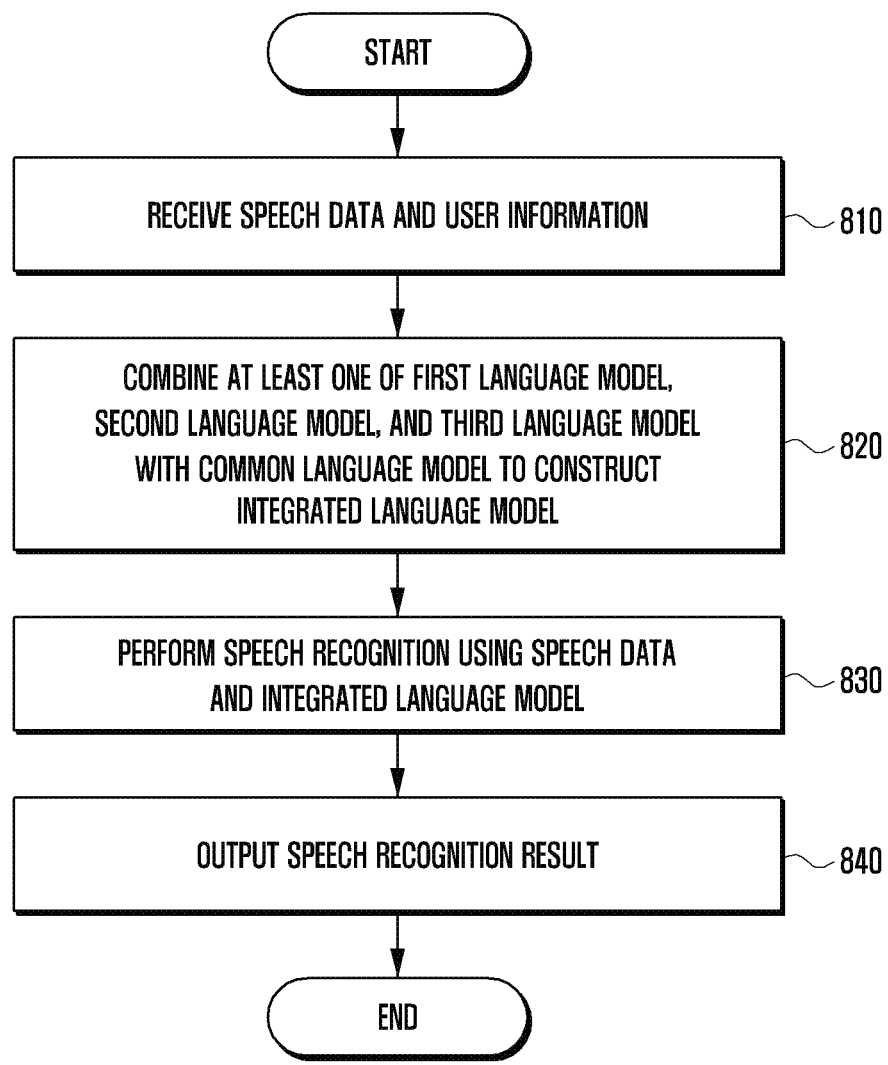
FIG. 8 illustrates a flowchart depicting a speech recognition method of the electronic device according to various embodiments of the present disclosure.

FIG. 8 is a flowchart depicting a speech recognition method of the electronic device according to various embodiments of the present disclosure.

In various embodiments, the speech recognition method can be implemented using the electronic device shown in FIG. 4A and the language models shown in FIGS. 5 to 7.

With reference to FIG. 8, at step 810, the processor 420 of the electronic device may receive speech data and user information through the communication interface 410.

The speech data may indicate data containing speech sounds uttered by the user, and the user information may indicate information on the user collected by the external electronic device.

At step 820, the processor 420 may combine at least one of a first language model 500, a second language model 600, and a third language model 700 with a common language model to construct an integrated language model. As described before, the first language model 500, the second language model 600, the third language model 700, and the common language model may be constructed in advance before the user initiates speech recognition. When user speech data is received, it is possible to construct the integrated language model by combining the first language model 500, the second language model 600, the third language model 700, and the common language model constructed in advance.

The processor 420 may construct the first language model 500 on the basis of the user information received through the communication interface 410. As described in connection with FIG. 5, the processor 420 may select one or more detailed models corresponding to the user information among multiple detailed models contained in the first language model 500 and combine the selected detailed models to construct a new first language model 500.

The processor 420 may construct the second language model 600 on the basis of the user information received through the communication interface 410. As described in connection with FIG. 6, the processor 420 may select one or more detailed models corresponding to the context information of the user information among multiple detailed models contained in the second language model 600 and combine the selected detailed models to construct a new second language model 600.

The processor 420 may select one or more detailed models corresponding to the time of speech recognition among multiple detailed models contained in the third language model 700 and combine the selected detailed models to construct a new third language model 700. As described before, the third language model may be a language model in which words frequently used for a specific duration are updated on a periodic basis (e.g., daily, weekly, monthly, or a period selected by the user).

At step 830, the processor 420 may perform speech recognition by use of the speech data and the integrated language model. At step 840, the processor 420 may output the speech recognition result.

Figure 9:
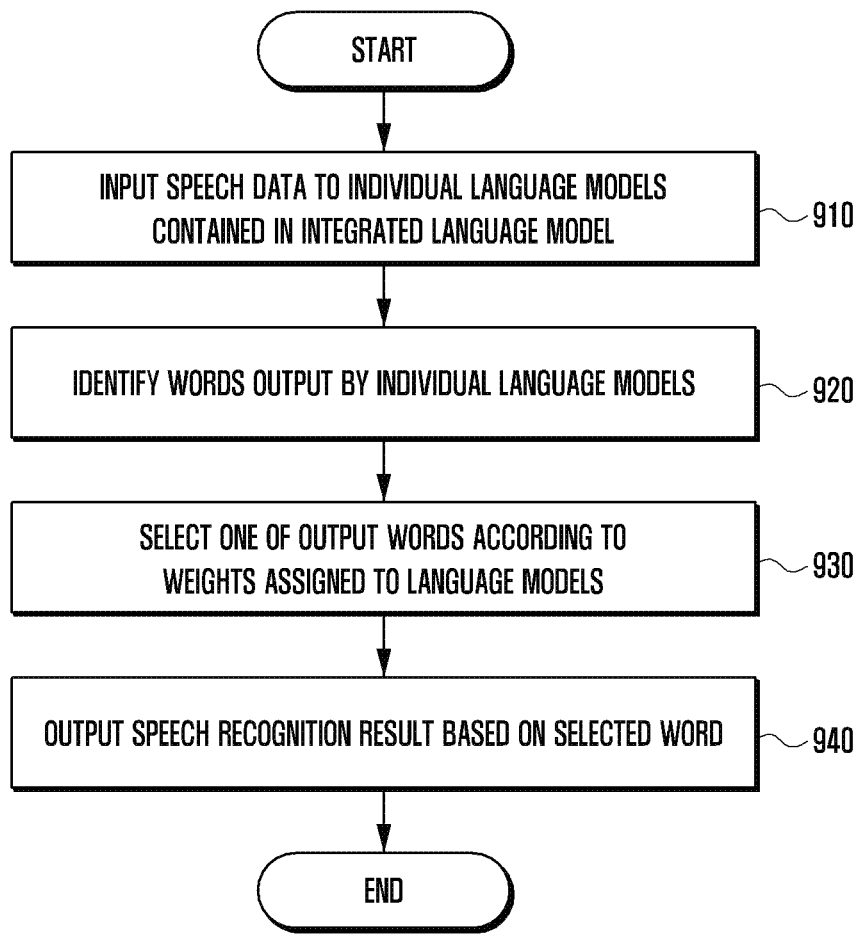
FIG. 9 illustrates a flowchart for speech recognition using an integrated language model in the speech recognition method of the electronic device according to various embodiments of the present disclosure.

FIG. 9 is a flowchart for speech recognition using an integrated language model in the speech recognition method of the electronic device according to various embodiments of the present disclosure. The flowchart of FIG. 9 is related to step 830 in FIG. 8.

With reference to FIG. 9, at step 910, the processor 420 of the electronic device may input the speech data received through the communication interface 410 to individual language models contained in the integrated language model.

At step 920, the processor 420 may identify words output by the individual language models. At step 930, the processor 420 may select one of the output words according to the weights assigned to the language models.

Selection of a word at step 930 is described in detail with reference to FIG. 4, and a detailed description thereof is omitted.

At step 940, the processor 420 may output a speech recognition result on the basis of the selected word.

Figure 10:
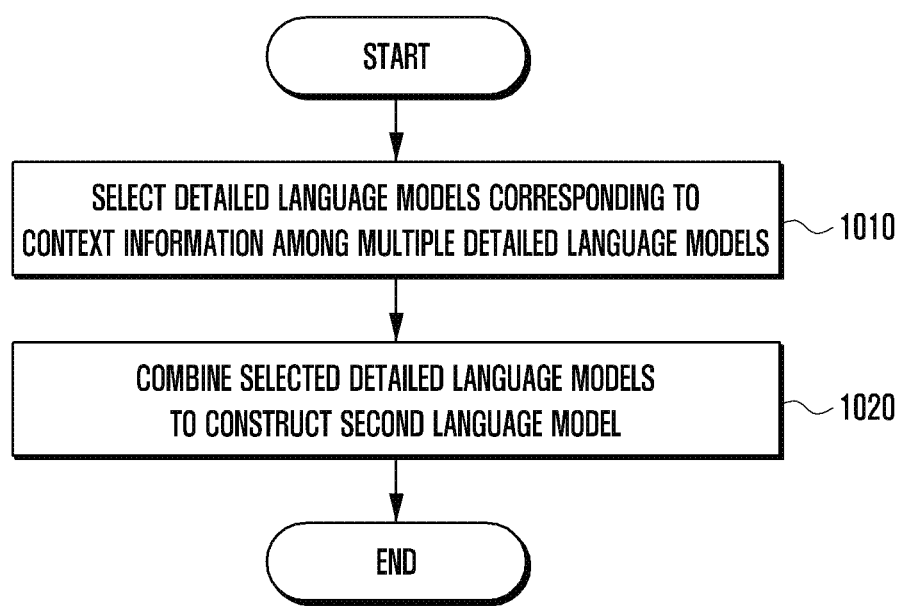
FIG. 10 illustrates a flowchart for constructing a second language model in the speech recognition method of the electronic device according to various embodiments of the present disclosure.

FIG. 10 is a flowchart for constructing a second language model in the speech recognition method of the electronic device according to various embodiments of the present disclosure.

With reference to FIG. 10, at step 1010, the processor 420 of the electronic device may select one or more detailed language models corresponding to the context information among multiple detailed language models contained in the second language model 600. The electronic device may receive context information when receiving the speech data. When a mobile terminal of the user is connected to the electronic device, the context information may be extracted and sent to the electronic device. This context information may be used to construct the second language model.

At step 1020, the processor 420 may combine the selected detailed language models to construct a new second language model.

The second language model may be combined with the integrated language model, and the processor 420 may perform speech recognition using the integrated language model.

According to various embodiments of the present disclosure, a speech recognition method for an electronic device may include: receiving speech data of the user and user information from an external electronic device; constructing an integrated language model by combining a common language model with at least one of a first language model associated with the identifier of the external electronic device contained in the user information, a second language model associated with context information of the user, and a third language model associated with words collected by the electronic device for a preset period of time from the reception time of the speech data; and outputting a speech recognition result corresponding to the speech data on the basis of the integrated language model.

In one embodiment, outputting a speech recognition result may include: inputting the speech data to individual language models contained in the integrated language model and identifying words output by the individual language models; selecting one of the output words according to the weights assigned to the language models; and outputting a speech recognition result on the basis of the selected word.

In one embodiment, outputting a speech recognition result may include: identifying words extracted using the individual language models contained in the integrated language model; selecting, if the extracted words are different, one of the extracted words according to the weights assigned to the individual language models; and outputting a speech recognition result on the basis of the selected word.

In one embodiment, the first language model may be a language model in which the probability that a word contained in the first language model matches the speech data is set differently according to at least one of a list of applications installed in the external electronic device and a keypad usage history of the external electronic device.

In one embodiment, the first language model may be a language model in which the probability that a word contained in the first language model matches the speech data is set differently according to the counterpart with which the user using the external electronic device has communicated.

In one embodiment, the speech recognition method may further include: selecting one or more detailed language models corresponding to the context information of the user information among multiple detailed language models contained in the second language model; and constructing the second language model using the selected detailed language models.

In one embodiment, the second language model may be a language model in which the probability that a word contained in the second language model matches the speech data is set differently according to the context information.

In one embodiment, the context information may include at least one of information on the application running on the external electronic device, information on the time at which the speech data is received, information on the location of the external electronic device, and personal information of the user.

In one embodiment, the third language model may be a language model in which the probability that a word contained in the third language model matches the speech data is set differently according to the usage frequencies during a preset period of time from the time when the speech data is received.

The above-discussed method is described herein with reference to flowchart illustrations, methods, and computer program products according to example embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Certain example aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various example embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various example embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a processor;
   a communication interface operatively coupled to the processor, the communication interface configured to receive speech data of a user and user information from an external electronic device; and
   a memory operatively coupled to the processor, the memory configured to store a common language model used by default for speech recognition, a first language model designated for each user, a second language model associated with context information of each user, a third language model associated with words collected by the electronic device for a preset period of time from a reception time of the speech data, and a fourth language model based on a list of words extracted from words entered by each user through their respective keypads before performing speech recognition
   the processor configured to:
   combine at least one of the first language model, the second language model, the third language model, and the fourth language model with the common language model to construct an integrated language model;
   perform the speech recognition based on the speech data and the integrated language model; and
   output a speech recognition result corresponding to the speech data;
   input the speech data to individual language models contained in the integrated language model and identify words output by the individual language models;
   select one of the output words according to weights assigned to the individual language models; and
   output the speech recognition result based on the selected word.

2. The electronic device of claim 1, the processor further configured to:
   identify words extracted using individual language models of the integrated language model;
   select, if the extracted words are different, one of the extracted words according to weights assigned to the individual language models;
   and output the speech recognition result based on the selected word.

3. The electronic device of claim 1, wherein the first language model is a language model in which a probability that a word contained in the first language model matches the speech data is set differently according to at least one of a list of applications installed in the external electronic device, a keypad usage history of the external electronic device, a list of contacts stored in the external electronic device, or a playlist of music files stored in the external electronic device.

4. The electronic device of claim 1, wherein the first language model is a language model in which a probability that a word contained in the first language model matches the speech data is set differently according to a counterpart with which the user using the external electronic device has communicated.

5. The electronic device of claim 1, the processor further configured to:
   select one or more detailed language models corresponding to context information of the user information among multiple detailed language models contained in the second language model; and
   construct a new second language model using the selected detailed language models.

6. The electronic device of claim 5, wherein the second language model is a language model in which a probability that a word contained in the second language model matches the speech data is set differently according to the context information.

7. The electronic device of claim 6, wherein the context information comprises at least one of information on an application running on the external electronic device, information on the reception time of the speech data, information on a location of the external electronic device, or personal information of the user.

8. The electronic device of claim 1, wherein the third language model is a language model in which a probability that a word contained in the third language model matches the speech data is set differently according to usage frequencies during the preset period of time from the reception time of the speech data.

9. An electronic device comprising: a processor;
   a microphone operatively coupled to the processor, the microphone configured to receive a speech signal of a user and convert the speech signal into speech data;
   a communication interface operatively coupled to the processor, the communication interface configured to transmit the speech data to an external electronic device; and
   a memory operatively coupled to the processor, the memory configured to store the speech data, user information, and context information; the processor configured to:

extract words from a plurality of words entered by the user through a keypad before performing speech recognition;

control the communication interface to send a list of the extracted words to the external electronic device;

control the communication interface to receive a speech recognition result from the external electronic device; and output the speech recognition result, wherein the speech recognition result is produced based on the speech data and an integrated language model that is constructed by combining at least one of a first language model constructed based on the list of words, a second language model constructed based on the context information of the user, and a third language model constructed based on words collected by the external electronic device for a preset period of time from a transmission time of the speech data with a common language model used by default for the speech recognition;

select one of the output words according to weights assigned to the individual language models; and output the speech recognition result based on the selected word.

10. The electronic device of claim 9, the processor further configured to:

select one or more detailed language models corresponding to context information of the user information among multiple detailed language models contained in the second language model; and construct a new second language model using the selected detailed language models.

11. A method of speech recognition for an electronic device, the method comprising:

receiving speech data of a user and user information from an external electronic device;

constructing an integrated language model by combining a common language model with a language model based on a list of extracted words extracted from words entered by the user through a keypad before performing speech recognition and optionally one or more of a first language model associated with an identifier of the external electronic device contained in the user information, a second language model associated with context information of the user, and a third language model associated with words collected by the electronic device for a preset period of time from a reception time of the speech data; and outputting a speech recognition result corresponding to the speech data based on the integrated language model;

select one of the output words according to weights assigned to the individual language models; and output the speech recognition result based on the selected word.

12. The method of claim 11, further comprising:

identifying words extracted using individual language models contained in the integrated language model;

selecting, if the extracted words are different, one of the extracted words according to weights assigned to the individual language models; and outputting the speech recognition result based on the selected word.

13. The method of claim 11, wherein the first language model is a language model in which a probability that a word contained in the first language model matches the speech data is set differently according to at least one of a list of applications installed in the external electronic device or a keypad usage history of the external electronic device.

14. The method of claim 11, wherein the first language model is a language model in which a probability that a word contained in the first language model matches the speech data is set differently according to a counterpart with which the user using the external electronic device has communicated.

15. The method of claim 11, further comprising:

selecting one or more detailed language models corresponding to the context information of the user information among multiple detailed language models contained in the second language model; and constructing a new second language model using the selected detailed language models.

16. The method of claim 11, wherein the second language model is a language model in which a probability that a word contained in the second language model matches the speech data is set differently according to the context information.

17. The method of claim 16, wherein the context information comprises at least one of information on an application running on the external electronic device, information on the reception time of the speech data, information on a location of the external electronic device, or personal information of the user.

18. The method of claim 11, wherein the third language model is a language model in which a probability that a word contained in the third language model matches the speech data is set differently according to usage frequencies during the preset period of time from the reception time of the speech data.

* * * * *